Figure 1:
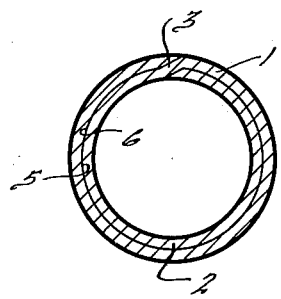

Aug. 22, 1961 M. GAUL 2,996,799
METHOD OF MANUFACTURING MULTI-LAYERED TUBE
Filed May 21, 1953

INVENTOR.
Max Gaul.
BY
Harness, Dickey & Pierce.
ATTORNEYS.

United States Patent Office 2,996,799
Patented Aug. 22, 1961

2,996,799
METHOD OF MANUFACTURING
MULTI-LAYERED TUBE
Max Gaul, Eppstein (Taunus), Germany, assignor to Hans Sickinger, Providence, R.I.
Filed May 21, 1953, Ser. No. 356,377
1 Claim. (Cl. 29—476.5)

The present invention relates to the manufacture of multi-layered tubing made of steel strip and, in particular, to a firm and permanent connection of both layers through essentially cold methods.

It is common knowledge that two-layered tubing, preferably with a relatively small diameter ranging between 4 mm. and 12 mm., is being manufactured of precoppered strip. To this end, the strip is passed through a special rolling machine in which is is longitudinally curled twice around itself to be finished rolled on a mandrel under great pressure. Subsequently, the tube is welded at a temperature slightly exceeding the melting point of copper (1087° C.) in an electric draft furnace or in a welding machine. The resulting high strength is well comparable to that of a seamless drawn tube. A tube of 10 mm. diameter and 0.7 mm. wall thickness, which was made in the manner described above, is capable of standing an internal pressure burden of up to 8,580 lbs. per sq. in. Such tubing, though excellently suited for its own purposes, presents however several grave disadvantages in connection with its manufacture, which are to be eliminated by the present invention.

These disadvantages will arise as a result of the heat treatment during the welding operation and are caused mainly by both qualitative and quantitative impurities in the strip of which the tubing is made. This interferes with, or seriously affects, the welding together of the electroplated copper layer either with the steel or with other copper layers, thus leading to rejects. Above all, it is the so-called hydrogen disease that leads to failure on a large scale in that hydrogen contained in oxides, and particularly in cuprous oxide, diffusing unimpededly from the protective gas into the red hot iron will combine with oxygen and develop water in the form of steam which cannot diffuse back. As a result, the tube layers will reveal cracks. The qualitative impurity of the raw material, which chiefly affects open hearth steel, differs according to the country of origin. Thus, steel strip originating from the same process of manufacture in the U.S. contains a tolerable percentage of rejects, while the rejects of the strip made in Germany represent an intolerably high percentage. This is largely due to the quality of the scrap which is required for the Siemens-Martin steel process and which must be carefully sorted and graded. If this cannot be done with the proper care, either because there is not sufficient scrap available or because the capacity of steel production is too limited, the qualitative impurity of Siemens-Martin steel becomes an unavoidable factor, and from an economical point of view, this steel becomes unserviceable for purposes like that under consideration. Should it nevertheless become necessary, for want of any better material, to make use of it, for instance in times of distress or war, the costs of production would be unreasonably increased so that tubing manufactured under such conditions might no longer be able to compete with other types of tubing.

The present invention is based on the theory and has for an object that the welding process can be entirely dispensed with, and that thereby and by reducing to a minimum any other heat treatments, the so-called hydrogen disease can be prevented, while simultaneously saving, wholly or largely, the costs of the required heat as well as those incurred by such preliminary copper-plating treatments as do not serve as protection against corrosion. Moreover, it is also an object that any kind of steel strip, even though it may have proved unsuitable for the heat treatment process, may be used for the manufacture of tubes by the present method.

Other objects, features, and advantages of the present invention will become apparent from the subsequent description, taken in conjunction with the accompanying drawings.

Figure 2:
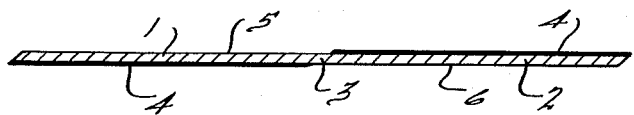

In the drawings:
FIGURE 1 is a section of the tube; and
FIGURE 2 is a section of the steel strip used for the original material.

The tube consists of two layers 1 and 2 of steel that join one another at the oblique portion 3 as shown in FIGURE 1. The tube is externally and internally copper plated or may be provided with any other corrosion resistant coating later on. According to the invention, the contacting faces 5 and 6 of the two layers 1 and 2 respectively are not copper plated, since a copper treatment may be dispensed with unless it is required for welding. The strip will therefore be copper plated only in part, as becomes evident from FIGURE 2 where the copper coats are marked by the lines 4. It goes without saying that entirely bright strip may also be used where no protective coat will be required, or where such a coat must be applied by way of a finishing operation. To establish a firm and permanent bond between the two layers 1 and 2, a binding agent of a liquid or solid type will be used the ingredients of which will produce a chemical reaction and thereby an oxidation of the two steel faces to be bonded. This binding agent is suitably applied during the curling operation on the rolling machine in a mechanical manner to the corresponding surface sections of the strip that are to face one another in the finishing operation. Such binding agents as are required for the present invention are known and may consist, for instance, of iron dust, ammonium chloride and biborate of soda to which glycerin or silicate of soda may be added as a medium. The amount or strength of the binding agent should be calculated so as to confine its effect to a thin surface layer of the steel which may be considered sufficient to establish a firm connection without producing any structural damage. The observance of this requirement is favoured by the fact that the two tube layers 1 and 2 are rolled up very tightly, as well as by the volumetric expansion of the released ferric oxide. Accordingly, such microscopically small cavities as may exist between the tube layers will be completely filled up, and a mechanically homogeneous sectional face is obtained, while no measurable layer has been formed by the binding agent.

The binding agents may be divided into slow acting and quick acting materials. Though quick acting agents should in general be given preference, since they abbreviate the time required for completing the finished tube, there is no objection to using slow acting binding agents if these offer any advantage of an economical or technical nature. It may be added that the period required by the slow agent to take effect, which may range from several days to weeks, might be utilized for keeping the otherwise completed tubes in storage. An improvement in the firmness of connection brought about by an extended storage or aging, without interference with the manufacturing requirements, may furthermore be claimed to be a considerable asset.

The doctrine generally valid in chemistry that chemical reaction may be accelerated by heat, applies also to the treatment of the freshly rolled tube. The amount of heat required would, however, not considerably reduce the savings made by the non-employment of welding heat, as the latter represents many times the amount of the former.

The strength of the tube made in accordance with the present invention is subject to two factors: to the tensile strength of the steel strip, and to the shearing strength on a plane between the two tube layers 1 and 2. For instance, with a tube of 10 mm. outside diameter and 0.7 mm. wall thickness, and with a tensile strength of the strip amounting to 35 kg./mm.$^2$, the tensile strength (bursting strength) of 1 cm. of tube in respect of a hydrostatic pressure will be 245 kg. If the shearing strength is assumed to be 4/5 of the tensile strength, the theoretical shearing stress acting upon 1 mm.$^2$ of the joint face between the two tube layers 1 and 2 may be computed by the following formula, and will amount to:

$$\frac{1.25 \times 245}{\frac{10+8.6}{2}} \times 3.14 \times 10 = 1 \text{ kg./mm.}^2$$

If, finally, the safety of the finished tube is assumed to be ten times as great, owing to its superior strength, the maximum safety shearing stress at the joint face of layers=0.1 kg./mm.$^2$. As this value is so negligible, it may be safely stated that a relatively slight adhesive force will be sufficient for the binding agent to bring about an inseparable connection of the two tube layers 1 and 2. It should also be considered that the exceedingly great strength of the hot welded tube will not be required for most practical purposes. In the great majority of cases, about 1/5 of the strength specified in the above example will be sufficient. These established facts render the object of the present invention, for most applications, fully equivalent to a hot-welded tube of similar construction, as well as to a seamless drawn tube.

Instead of ferric oxide as produced by the binding agent, other chemical reactions may also be utilized, provided that these meet with the following two requirements, i.e. that they produce an increase in volume as well as a strong bridging bond between the two faces to be thus connected. In order to do justice to the characteristics and effects of other reagents, such metals or other materials as may be required from case to case may also be applied to the faces to be bonded.

In general, the present novel procedure offers a fundamental advantage over the heat treating process described earlier, in that it may be applied irrespective of the kind of metal coating as long as steel is used for the base metal. In heat treating processes, this is not always practicable as the coating metal must be at the same time suitable as a soldering or welding agent. Considering the metallurgical and economical requirements, only tin and copper will be found to be eligible for this purpose. Zinc, for instance, must be excluded as a soldering or welding agent on account of its general characteristics, mainly of its easy oxidizability. If therefore galvanized tubes that play such an important part in modern engineering, are to be manufactured in the form of two-layered tubes, the present invention may be utilized to advantage. In this case, the strip (see FIGURE 2) is only partly coated with zinc so as to cover the exposed faces of the finished tube both externally and internally, while such sections as are brought into touch with one another will remain free from zinc. After these latter portions on the curled and finish-rolled tube have oxidized together, the galvanically applied zinc may be bound even more intimately to the steel by a melting-on treatment, since the required amount of heat is very low in view of the low melting point of zinc (416° C.). The same end can be reached also in another manner by passing the tube, after the above co-oxidation stage, through a bath containing melted zinc, thereby providing it with a coat of zinc. Both methods will result in a considerably increased zinc economy.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In a method for manufacturing multi-layered tubing from steel strip, the steps of applying a bonding agent consisting of iron dust, ammonium chloride, and biborate of soda to those surfaces of the strip which are to be in contact with each other so as to produce a bonding medium comprising a thin oxidized and volumetrically expanded layer on said surfaces, longitudinally curling the tube around itself, subjecting the tube to pressure which forces the contacting surfaces against each other, and causing pressure to be maintained between the contacting surfaces of the tube during oxidation of the contacting surfaces and until the bond is perfected, whereby said bonding medium will be forced into the microscopic interstices existing on the contacting surfaces.

References Cited in the file of this patent

UNITED STATES PATENTS

| | | |
|---|---|---|
| 574,184 | Warwick | Dec. 29, 1896 |
| 1,431,368 | Bundy | Oct. 10, 1922 |
| 1,667,787 | Jaeger et al. | May 1, 1928 |
| 1,892,607 | Bundy | Dec. 27, 1932 |
| 2,014,982 | Quarnstrom | Sept. 17, 1935 |
| 2,038,600 | Quarnstrom | Apr. 28, 1936 |
| 2,294,756 | Inutsuka et al. | Sept. 1, 1942 |
| 2,369,537 | Crawford | Feb. 13, 1945 |
| 2,468,206 | Keene | Apr. 26, 1949 |
| 2,505,197 | McCulloch | Apr. 25, 1950 |
| 2,584,354 | Kissinger et al. | Feb. 5, 1952 |
| 2,619,715 | Barr | Dec. 2, 1952 |
| 2,696,662 | LeSech | Dec. 14, 1954 |
| 2,720,022 | Snively | Oct. 11, 1955 |
| 2,803,570 | Hespenheide | Aug. 20, 1957 |

FOREIGN PATENTS

| | | |
|---|---|---|
| 160,079 | Australia | Dec. 2, 1954 |